United States Patent Office 3,824,110
Patented July 16, 1974

3,824,110
ADDITIVE COMPOSITION
Alfred Pelz, Linz-Puchenau, and Franz Jilek, Gallneukirchen, Austria, assignors to Osterreichische Stickstoffwerke Aktiengesellschaft, Linz (Danube), Austria
No Drawing. Filed Mar. 9, 1973, Ser. No. 339,954
Claims priority, application Austria, Mar. 29, 1972,
A 2,702/72
Int. Cl. C08f 45/52; C08h 13/08
U.S. Cl. 106—284                 7 Claims

ABSTRACT OF THE DISCLOSURE

Thermoplastic plastics materials such as polyolefines are rendered metallisable by admixing them with an additive composition comprising 40 to 80% by weight of lithopone, calcium carbonate or calcium phosphate as inorganic filler, 20 to 60% by weight of a coal tar pitch an 0 to 25% by weight of an amorphous completely or predominantly saturated hydrocarbon polymer, whereby the inorganic filler has a particle size of at most $5\mu$.

---

This invention relates to an additive composition and to a process for making polyolefines metallisable.

It is known that various thermoplastic materials may be metallised chemically-electrolytically by the addition of inorganic or organic fillers and appropriate pre-treatment by pickling. As a rule, such fillers are incorporated by mixing the thermoplastic material with the filler in extruders and subsequently granulating the mixture (see, for example, Austrian Pat. No. 278,465). This procedure has the disadvantage that to achieve the requisite homogeneity rather expensive mixing devices are required which as a rule are available only to the manufacturer but not to the individual processor. The processor must thus stock a fairly large range of metallisable grades of material in order to be able to meet all requirements regarding the manufacture of metallised articles from various plastics materials.

We have now found an additive composition which may be incorporated in a simple manner in polyolefins and places the processor in a position to render metallisable those types of plastics materials available to him, in a rapid manner, by incorporation of the composition. This represents a considerable simplification and an important advance for the processor.

Accordingly the present invention provides an additive composition for rendering polyolefinic plastics materials metallisable, which comprises 40 to 80% by weight, preferably 50–60% by weight, of an inorganic extremely finely divided filler which is at least partially soluble in sulphuric acid selected from the group consisting of lithopone precipitated calcium phosphate and precipitated or ground calcium carbonate or mixtures thereof 20 to 60% by weight, preferably 30 to 45% by weight, of a coal tar pitch and 0 to 25% by weight, preferably 5 to 10% by weight, of an amorphous completely or predominantly saturated hydrocarbon polymer.

The filler must have a particle size of at most $5\mu$ and advantageously a particle size of less than $2\mu$, but preferably less than $1\mu$. In the case of lithopone, the "Red Seal" grade, containing about 30% by weight of zinc sulphide, is especially preferred, this being economically preferable because the grades having a greater content of zinc sulphide are substantially more expensive.

Appropriately, a coal tar pitch is chosen which has a softening point (according to Kraemer-Sarnow) of above 100° C., preferably between 100 and 130° C. The use of distillate pitches is to be preferred to the use of blown pitches. The requisite good ease of distribution of a grade of pitch in the plastics material, which is the prerequisite for its use in the composition according to the invention, may be ascertained by a simple experiment.

The amorphous, completely or predominantly saturated, hydrocarbon polymer may be, for example, a polyisobutylene, a butyl rubber or an amorphous copolymer of ethylene and propylene. However, atactic polypropylene is particularly preferred. This should have as high a molecular weight as possible in order to have as little influence as possible on the properties of the plastics material which is to be rendered metallisable. It serves above all to reduce the brittleness of the mixture of inorganic filler and coal tar pitch and hence to improve the ease of granulation and ease of incorporation of the additive composition. The amount of amorphous polymer depends on the grade of pitch employed. If the latter is of low brittleness, a smaller amount of polymer suffices. In the case of grades of pitch which possess no significant brittleness the addition of the polymer may also be dispensed with entirely.

The present invention also provides a process for rendering a thermoplastic material metallisable which comprises homogeneously mixing with the plastics material an additive composition as described above, in an amount of 10 to 40% by weight, preferably 20 to 30% by weight, relative to the final mixture.

Examples of thermoplastic plastics materials which may be rendered metallisable according to the process of this invention are polypropylene, high density polyethylene, ethylene propylene copolymers, preferably those with an ethylene content of 5 to 25%, polybutene or polymethylpentene.

The manufacture of the additive composition, the technological character of which is comparable with a masterbatch, is effected by mixing the components in an appropriate kneader whilst warm, and subsequently granulating the mixture. The incorporation of the concentrate into the plastics material may be effected in the usual manner in a mixing screw or some other apparatus of comparable action. It is important that the concentrate should be mixed completely homogeneously with the plastics material. The injection mouldings obtained from such mixtures may be metallised directly in accordance with the conditions customary for ABS resins (acrylonitrile-butadiene-styrene). Since mouldings of ABS resins at the present time represent the major proportion of mouldings which are metallised, most electroplating establishments are equipped exclusively for this process. With the aid of the concentrate according to the invention it is now possible also to metallise other plastics materials under the same process conditions so that the establishments concerned do not require to make any changes.

The Example which follows, in which all percentages are by weight, shows that the incorporation of the additive composition according to the invention produces only little change in the properties of the plastics material modified in this way as compared to the unmodified plastics material. The mouldings metallised according to ABS conditions showed a perfect metallisation, whereof the metal deposit tended to tear within itself, in the peel test according to DIN 40,802, before it could be pulled off the plastics substrate.

EXAMPLE

First, an active compound concentrate of the following composition is mixed in a heated bowl kneader:

50% of lithopone "Red Seal" (=30% of ZnS)
42% of hard coal tar pitch (Kraemer-Sarnow softening point 105° to 110° C.)
8% of atactic polypropylene (high molecular)

After cooling, the mass is ground on a granulating mill, mixed in amounts of 20, 25 and 30% with 80, 75 and 70%, respectively, of isotactic polypropylene, and moulded by an injection moulding process.

The Table which follows shows how little change the active substance concentrate produces in the melt index of the polypropylene:

Polypropylene grade for semi-finished goods:

M.I. 230° C., 2.16 kg., g./10 min. (ASTM-1238)

| | |
|---|---|
| Without additives | 0.31–0.32 |
| With 20% additive | 0.39–0.41 |
| With 25% additive | 0.43–0.44 |
| With 30% additive | 0.55 |

Polypropylene grade for injection moulding:

M.I. 230° C., 2.16 kg., g./10 min. (ASTM-1238)

| | |
|---|---|
| With additive | 3.47–3.50 |
| With 20% additive | 3.10–3.15 |
| With 25% additive | 3.79–3.93 |
| With 30% additive | 4.30–4.33 |

The remaining mechanical data also showed no significant change and the low temperature impact strength even showed a slight improvement.

Mouldings, for example parts of housings, grids and plates for decorative purposes, from the mixtures thus produced, after pickling with a chromic acid/sulphuric acid bath (25 parts by weight of $CrO_3$, 30 parts by weight of concentrated $H_2SO_4$, 45 parts by weight of water), may be metallised chemically-electrolytically at temperatures of 60° to 65° C. and within a period of treatment of 5 to 20 minutes, in the way which is customary for ABS plastics.

The metallised mouldings obtained show a peel strength of more than 2.5 kp. in the peel test according to DIN 40,802. In most cases, the adhesion is even so high that the metal layer tears within itself before the peel force is reached.

The same effect can be obtained, when the active compound concentrate of the example is mixed in amounts of 20, 25 and 30% with high density polyethylene and propylene-ethylene copolymers with an ethylene content from 5 to 20%.

What we claim is:

1. An additive composition for rendering thermoplastic polyolefines metallisable, which comprises 40 to 80% by weight of an inorganic filler consisting of 20 to 60% by weight of a coal tar pitch and 0 to 25% by weight of an amorphous at least predominantly saturated hydrocarbon polymer, whereby the inorganic filler has a particle size of at most $5\mu$, which composition is added to the polyolefine in an amount of 10 to 40% by weight, relative to the final mixture.

2. A composition according to claim 1, which contains 50 to 60% by weight of the inorganic filler and 30 to 45% by weight of the coal tar pitch.

3. A composition according to claim 1, in which the inorganic filler is a lithopone having a zinc sulphide content of 30% by weight.

4. A composition according to claim 1, in which the coal tar pitch is a coal tar distillate pitch of softening point (according to Kraemer-Sarnow) in the range of 100° to 130° C.

5. A composition according to claim 1, in which the amorphous hydrocarbon polymer is a high molecular weight atactic polypropylene.

6. A composition according to claim 1, in which the inorganic filler has a particle size of at most $2\mu$.

7. A process for rendering thermoplastic polyolefines metallisable which comprises homogeneously mixing with the polyolefines an additive composition in an amount of 10 to 40% by weight, relative to the final mixture, whereby the additive composition comprises 40 to 80% by weight of an inorganic filler consisting of lithopone, 20 to 60% by weight of a coal tar pitch and 0 to 25% by weight of an amorphous at least predominantly saturated hydrocarbon polymer.

References Cited

UNITED STATES PATENTS

| | | | |
|---|---|---|---|
| 3,635,865 | 1/1972 | Edwards | 260—28.5 AS |
| 3,692,722 | 9/1972 | Clarke | 260—28.5 AS |
| 3,361,692 | 1/1968 | Parkinson | 260—28.5 AV |
| 3,336,252 | 8/1957 | Raichle | 260—28.5 AS |
| 3,634,293 | 1/1972 | Bonitz | 260—28.5 AS |

FOREIGN PATENTS 1,044,503  10/1966  Great Britain.

ALLAN LIEBERMAN, Primary Examiner
P. R. MICHL, Assistant Examiner

U.S. Cl. X.R.
260—28.5 AS